United States Patent [19]

Sugimori et al.

[11] Patent Number: 4,501,853
[45] Date of Patent: Feb. 26, 1985

[54] EPOXY RESIN COMPOSITION AND METHOD FOR THE PREPARATION OF THE SAME

[75] Inventors: Masaru Sugimori; Koichiro Sanji, both of Takatsuki; Hirohide Tomoyasu, Moriyama; Toshimori Sakakibara, Shiga, all of Japan

[73] Assignee: Sunstar Giken Kabushiki Kaisha, Osaka, Japan

[21] Appl. No.: 428,160

[22] Filed: Sep. 29, 1982

[30] Foreign Application Priority Data

Nov. 26, 1981 [JP] Japan ................................. 56-190103

[51] Int. Cl.³ ...................... C08L 9/00; C08L 63/00; C08L 75/04; C08L 81/04
[52] U.S. Cl. ................................... 525/122; 525/453; 525/454; 525/523; 525/528; 525/529; 525/537
[58] Field of Search ............... 525/119, 122, 529, 528, 525/523, 537, 452, 453, 455, 454

[56] References Cited

U.S. PATENT DOCUMENTS 3,270,698 11/1973 Riew ..................................... 525/119
3,947,522 3/1976 Shelley, Jr. et al. ................. 525/122

FOREIGN PATENT DOCUMENTS 1054699 4/1959 Fed. Rep. of Germany ...... 525/119
45-39182 12/1970 Japan ................................... 525/119
56-135579 10/1981 Japan ................................... 525/119
999383 7/1965 United Kingdom ................. 525/119
696038 11/1979 U.S.S.R. .............................. 525/119

Primary Examiner—Allan M. Lieberman
Attorney, Agent, or Firm—Wegner & Bretschneider

[57] ABSTRACT

An improved curable epoxy resin composition comprising an epoxy resin and vulcanized rubber particles having a particle size of 0.5 to 30μ which are obtained by vulcanizing a dispersion of fine particles of a liquid rubber incompatible with the epoxy resin in the epoxy resin with a vulcanizing agent, and a method for the preparation of the same. The curable epoxy resin composition has excellent flexibility, mechanical strength and peel strength when cured with a curing agent, and is useful as an adhesive, coating material or molding material.

8 Claims, No Drawings

EPOXY RESIN COMPOSITION AND METHOD FOR THE PREPARATION OF THE SAME

The present invention relates to an improved epoxy resin composition and a method for the preparation thereof. More particularly, it relates to a curable epoxy resin composition comprising an epoxy resin and vulcanized rubber particles which shows excellent flexibility, mechanical strength and peel strength when cured with a curing agent and is useful as an adhesive, coating material or molding material, and method for the preparation of the composition.

An epoxy resin composition has usually excellent properties, such as small curing shrinkage, dimension stability and mechanical strength when cured, excellent electrical characteristics suitable as an electrical insulator, and further excellent heat resistance, water resistance and chemical resistance. Particularly, when the epoxy resin composition is used as an adhesive and coating material, it shows excellent adhesion and adherence to metals, ceramics or concretes and also excellent mechanical strength such as shear strength and tensile strength. However, the cured epoxy resin composition is usually inferior in flexibility, and hence, it shows very low peeling strength and breaking strength which cause cracking or peeling. Besides, when the epoxy resin composition is used as a molding material, the molded product is brittle and hence is easily broken by various impacts.

In order to eliminating the brittleness of the conventional cured epoxy resin composition, there have been proposed various methods, for example, a method of externally plasticizing the epoxy resin by adding thereto various materials compatible with the epoxy resin, such as polysulfide polymers, flexible urethane resins or acrylonitrile-butadiene copolymer which are used in the form of solid or liquid [cf. J. Appl. Polymer Sci., 17, 1377 (1973)], and a method of internally plasticizing the epoxy resin by incorporating with a flexible epoxy resin or by adding thereto various materials having a functional group reactive with the epoxy resin, such as urethane resins or modified acrylonitrile-butadiene copolymer which are compatible with the epoxy resin (cf. Japanese Patent Publication No. 5056/1977). However, according to the external plasticizing method, the composition gives a cured epoxy resin having extremely inferior mechanical strength and chemical properties at a high temperature or under various circumstances, and on the other hand, according to the internal plasticizing method, the flexibility of the resin is not necessarily sufficiently improved.

There has recently been proposed another improved method, wherein so-called matrix structure is formed by mixing an epoxy resin and a curing agent with a liquid rubber with stirring, whereby the liquid rubber becoming incompatible with the epoxy resin with progress of the curing reaction and being uniformly dispersed in the composition, followed by curing the epoxy resin [cf. J. Appl. Polymer Sci., 26, 889–905, 907–919 (1981)]; or by mixing previously an epoxy resin with solid rubber particles and curing the epoxy resin with a curing agent (cf. Japanese Patent Publication No. 32420/1973). However, according to the method of mixing an epoxy resin with a liquid rubber which beomes incompatible with the epoxy resin and is dispersed and then curing the epoxy resin with a curing agent, it is very difficult to control the curing rate of the resin and the rate of aggregation of the liquid rubber so as to disperse the solidified rubber particles in the epoxy resin and form the desired matrix. That is, the method is inferior in reproducibility. Besides, when the matrix structure is formed by mixing previously an epoxy resin with solid rubber particles and curing the mixture, the solid rubber particles must be divided as finely as possible and must have almost real round shape in order to be uniformly dispersed in the epoxy resin. However, the particles are coarse or have angular or flat shape, so that the particles are disadvantageously separated out or aggregated with lapse of time, or the particle size thereof will be changed. Conventional solid rubber particles do not satisfy these conditions and hence the desired effects can hardly be achieved. Moreover, according to this method, even if the desired particles are available, it is very difficult to obtain the desired matrix structure wherein the epoxy resin layer interacts with the rubber particles.

The present inventors have intensively studied for giving flexibility to the cured epoxy resin while keeping the excellent mechanical strength. As a result, it has been found that the desired epoxy resin composition which can give a cured product having excellent flexibility as well as mechanical strength can be obtained by dispersing uniformly a liquid rubber incompatible with an epoxy resin in the epoxy resin and then vulcanizing the rubber, by which vulcanized rubber particles having almost real round shape are uniformly dispersed in the resin. The epoxy resin composition of the present invention can easily be cured with a curing agent and can give a cured product having a matrix structure wherein fine solid rubber particles which are previously vulcanized and have almost real round shape are uniformly dispersed in the cured epoxy resin.

An object of the present invention is to provide an improved curable epoxy resin which can give a cured product having matrix structure wherein vulcanized rubber particles are uniformly dispersed in the cured epoxy resin. Another object of the invention is to provide a method of the production of a curable epoxy resin composition comprising an epoxy resin and vulcanized rubber particles by so-called dynamic vulcanization. These and other objects and advantages of the present invention will be apparent from the following description.

The curable epoxy resin composition of the present invention comprises an epoxy resin and vulcanized rubber particles having a particle size of 0.5 to 30$\mu$ which are obtained by vulcanizing a dispersion of fine particles of liquid rubber incompatible with the epoxy resin in the epoxy resin with a vulcanizing agent.

The curable epoxy resin composition is produced by the steps of heating an epoxy resin, adding thereto a liquid rubber incompatible with the epoxy resin, forcibly stirring the mixture and thereby dispersing the liquid rubber in the epoxy resin, and vulcanizing the rubber with a vulcanizing agent to form a dispersion of solid fine particles of vulcanized rubber in the epoxy resin.

The epoxy resin used in the present invention includes all conventional epoxy resins which are liquid at room temperature or at an elevated temperature, and the most suitable example of the resins is selected in accordance with the desired utility of the final composition. Suitable examples of the epoxy resin are condensation products of epichlorohydrin and a polyhydric alcohol or polyhydric phenol (e.g. bisphenol A), such as glycerol type epoxy resins, e.g. commercially available product in the name of Epikote 812 (manufactured by Shell Chemical in U.S.A. and by Yuka Shell Epoxy Co. in Japan), bisphenol type epoxy resins, e.g. commercially available products in the name of Epikote 815, 827, 828, 832, 834, 836, 1001, 1004, and 1007 (manufactured by Shell Chemical in U.S.A. and by Yuka Shell Epoxy Co. in Japan), Araldite GY257, GY252, GY250, GY260, GY280, 6071, 7071, 7072, 6084, 7097, and 6097 (manufactured by Ciba-Geigy), Dow Epoxy Resin D.R. 330, 331, 332, 334, 335, 336, 337, 661, 662, 664, 667, and 668 (manufactured by Dow Chemical International); cyclohexane oxide type epoxy resins, such as the commercially available products in the name of Chisso Nox 201, 221, 289, and 206 (manufactured by Chisso Corp. in Japan); cyclopentane oxide type epoxy resins, such as Chisso Nox 205 (manufactured by Chisso Corp. in Japan) and ERL 4205 (Union Carbide Corp in USA); epoxy resins derived from a di- or polyolefin polymer or copolymer, such as BF1000, 1050 (manufactured by Adeka Agas Chemical K.K.), Nisso PB-BF1000 (manufactured by Nippon Soda K.K.); epoxy resins obtained from a copolymer of glycidyl methacrylate and a vinyl compound, such as Ripoxy R840, E1000X, (manufactured by Showa Koubunshi K.K.); and epoxy resins obtained from a glyceride of a highly unsaturated aliphatic acid, such as Epikote 871 (manufactured by Yuka Shell Epoxy Co. in Japan). These epoxy resins may be used in a mixture thereof with other known thermoplastic or thermosetting resins.

The liquid rubber incompatible with the epoxy resin includes urethane rubbers, polysulfide rubbers, and a polymer of a dienic hydrocarbon or a copolymer thereof with other copolymerizable monomers, such as butadiene rubbers, acrylonitrile-butadiene rubbers, chloroprene rubbers, isoprene rubbers, styrene-butadiene rubbers, and modified products of these rubbers wherein carboxyl, hydroxy and/or amino groups are introduced into one or both terminals and/or intermediate of chain of the rubbers. Suitable examples of the liquid rubber are urethane rubber such as Takenato (manufactured by Takeda Chemical in Japan), polysulfide rubber such as Thiocol Lp-8 (manufactured by Thiocol Chem. Corp), Butadiene rubber such as Nisso PB (manufactured by Nippon Soda K.K. in Japan), acrylonitrile-butadiene rubber such as Nipol DN-601 (manufactured by Nippon Zeon K.K. in Japan), iroprene rubber such as Kuraprene LIR (manufactured by Kuraray Isoprene Chemical Co. in Japan), and styrene-butadiene rubber such as Flosbrene (manufactured by American Synthetic Rubber Corp. in U.S.A.). Most preferable example of the rubber is a polymer or copolymer of a diene type hydrocarbon which has a functional group being capable of bonding with the epoxy resin at one or both terminals and/or intermediate of chain of the polymer or copolymer, for example, Kurare Liquid IR 450 (manufactured by Kuraray Isoprene Chemical Corp. in Japan), Hycar CTBN 1300×8 (manufactured by Ube industries Ltd. in Japan), Polybd R45HT, R45MA (manufactured by Idemitsu Petroleum Chemical Corp. in Japan).

The liquid rubber should be incompatible with the epoxy resin in each combination selected. In other words, the liquid rubber used in a specific embodiment should be incompatible with the epoxy resin selected in said embodiment. In the present invention, the term "incompatible" means such a case that when an epoxy resin (100 parts by weight) is mixed with a liquid rubber (20 parts by weight) at a vulcanization temperature (usually about 150° C.) and the mixture is stirred at about 5,000 rpm for 10 minutes with a homomixer and then allowed to stand at the same temperature for several tens of minutes, the mixture is separated into two layers or is in the turbid state.

The liquid rubber is not necessarily required to be chemically bonded with the epoxy resin, but preferably contains a functional group to be bonded with the epoxy resin. For example, a liquid rubber containing a carboxyl, hydroxy or amino group at the terminal thereof may partially be bonded with the epoxy resin during the vulcanization thereof, by which the improvement of properties of the epoxy resin will be promoted.

The liquid rubber is incorporated with the epoxy resin in an amount of 0.05 to 60 parts by weight, preferably 0.5 to 20 parts by weight, to 100 parts by weight of the epoxy resin.

The vulcanizing agent used in the present invention has a wide meaning and includes not only so-called vulcanizing agent but also a crosslinking agent. Examples of the vulcanizing agent are sulfur; sulfur compounds such as sulfur dichloride, morpholine disulfide, and alkylphenol disulfide (e.g. Vultac 2, 3, 4 and 5, manufactured by Pennwalt Corp), N,N'-dithio-bis(hexahydro-2H-azepinone-2), or phosphorus-containing polysulfide; other inorganic vulcanizing agents such as selenium, tellurium, magnesium oxide, litharge, zinc oxide, or lead peroxide; oximes such as p-quinone dioxime, p,p'-dibenzoylquinonedioxime, or tetrachloro-p-benzoquinone dioxime; nitroso compounds such as poly-p-dinitrosobenzene, bis-nitroso-4-phenyl-1,4-piperazine, or N-(2-methyl-2-nitropropyl)-4-nitrosoaniline; organic peroxides such as tert-butyl hydroperoxide, cumene hydroperoxide, di-tert-butyl peroxide, tert-butyl cumyl peroxide, dicumyl peroxide, 2,5-dimethyl-2,5-di(tert-butylperoxy)hexane, 2,5-dimethyl-2,5-di(-tert-butylperoxy)hexyne-3, 1,3-bis(tert-butylperoxyisopropyl)benzene, 1,1-bis(tert-butylperoxy)-3,3,5-trimethycyclohexane, n-butyl 4,4-bis(tert-butylperoxy)valerate, benzoyl peroxide, p-chlorobenzoyl peroxide, 2,4-dichlorobenzoyl peroxide, tert-butyl peroxybenzoate, tert-butyl peroxyisopropylcarbonate, or tert-butyl perbenzoate; resin vulcanizing agents such as an alkylphenol-formaldehyde resin, melamineformaldehyde condensate, triazineformaldehyde condensate; crosslinking agents such as hexamethoxymethyl melamine, N,N'-m-phenylenedimaleimide; or the like.

In the vulcanization reaction, a vulcanization accelerator may optionally be used in order to shorten the vulcanization reaction time, to lower the vulcanization temperature, to decrease the amount of the vulcanizing agent, and further to improve more the physical and chemical properties of the vulcanized rubber. The vulcanization accelerator includes all conventional accelerators, such as thiazole derivatives (e.g. 2-mercaptobenzothiazole, benzothiazolyl disulfide, zinc salt of 2-mercaptobenzothiazole N-morpholino-2-benzothiazole sulfenamide, N-cyclohexyl-2-benzothiazolyl sulfenamide), thiuram compounds (e.g. tetramethylthiuram monosulfide, tetramethylthiuram disulfide (Thiram), guanidine or its derivatives (e.g. diphenylguanidine, di-ortho-tolylguanidine), xanthate compounds (e.g. zinc butyl xanthate, zinc isopropylxanthate), thiourea or its derivatives (e.g. N,N'-diphenylthiourea, trimethylthiourea), dithiocarbamate compounds (e.g. potassium dimethyldithiocarbamate, zinc dimethyldithiocarbamate (Ziram), zinc diethyldithiocarbamate), or the like. Suitable example thereof may be selected in the light of the vulcanization accelerating effect, effects on the properties of the final products, toxicity, odor, dispersibility, etc. of these accelerators.

The method of the preparation of the epoxy resin composition of the present invention is explained in more detail below.

The starting epoxy resin is heated to about 100° to 200° C., by which when the epoxy resin is solid, it melts, and thereto is added a liquid rubber incompatible with the epoxy resin in an amount of 0.05 to 60 parts by weight to 100 parts by weight of the epoxy resin. The mixture is stirred at 1,000 to 10,000 r.p.m. with an appropriate mixing machine (e.g. automatic homomixer), the incompatible liquid rubber is dispersed in the epoxy resin. Immediately after the stirring, a vulcanizing agent is added to the dispersion, optionally together with an appropriate vulcanization accelerator. The amount of the vulcanizing agent and vulcanization accelerator is not specified but is in the range that they are used in the conventional vulcanization reaction. The vulcanization reaction is usually carried out at a temperature of 130° to 170° C. and is finished within a period of several tens of minutes, preferable within about 30 minutes, by which vulcanized rubber particles having a particle size of 0.5 to 30μ are dispersed in the epoxy resin, which can give a matrix structure when cured. When the liquid rubber has a functional group reactive with epoxy group of the epoxy resin, the vulcanization reaction is controlled so that the vulcanization rate becomes more rapid than the reaction rate of the functional group and the epoxy group, for example by controlling the amount of vulcanizing agent and vulcanization accelerator, or the temperature for degradation of vulcanization agent and/or vulcanization accelerator.

The epoxy resin composition thus obtained has excellent properties, for example excellent flexibility which is required for adhesive, excellent crack resistance which is required for coating agent, excellent impact resistance which is required for molding products. Besides, when the epoxy resin composition of the present invention is incorporated into various resins such as phenol resins, melamine resins, urea resins, polyester resins, it is effective for improving the physical and chemical properties of these resins.

Within the kinds and amounts of the epoxy resins and liquid rubbers mentioned hereinbefore, the suitable combination of the epoxy resin and liquid rubber is selected in accordance with the desired utilities of the final compositions. When the composition of the present invention is used as an adhesive, a combination of an epoxy resin selected from a bisphenol A diglycidyl ether type epoxy resin and a liquid rubber selected from a terminal modified acrylonitrile/butadiene rubber in a mixed ratio of 100:0.5 to 100:20 by weight is preferably used, in order to give the composition having improved peel strength and also flexibility as well as adhesion. Most suitable combination for using as an adhesive is a bisphenol A diglycidyl ether type epoxy resin, a terminal modified liquid rubber, particularly an acrylonitrile/butadiene rubber modified with carboxy group at the terminal (nitrile content: 30% by weight or less), and a vulcanizing agent selected from organic peroxides or metal oxides (e.g. MgO). When the composition is used as a coating agent, a combination of an epoxy resin selected from a bisphenol A diglycidyl ether type epoxy resin and a liquid rubber selected from a terminal modified acrylonitrile/butadiene rubber in a mixed ratio of 100:0.5 to 100:20 by weight is preferably used, in order to give the composition having improved crack resistance in addition to the properties of the epoxy resin. When the composition is used as a molding material, a combination of an epoxy resin selected from a bisphenol A diglycidyl ether type epoxy resin and a liquid rubber selected from a terminal modified acrylonitrile/butadiene rubber in a mixed ratio of 100:0.5 to 100:20 by weight is preferably used, in order to give the composition having improved impact strength.

The epoxy resin composition of the present invention is usually used together with various curing agents, such as a cold-curing type agent (in the form of two-pack type) or a heat-curing type agent (in the form of one-pack or two-pack type). Suitable curing agent is selected in accordance with each utility of the composition. Suitable examples of the curing agent are acid anhydrides such as methylnardic anhydride, dodecenylsuccinic anhydride, tetrahydrophthalic anhydride, hexahydrophthalic anhydride, chlorendic anhydride, trimellitic anhydride ethylene glycol ester, methyl tetrahydrophthalate anhydride; imidazole or its derivatives such as imidazole, 2-methyl imidazole, 2-ethyl-4-methylimidazole, 2-phenylimidazole, 2-undecylimidazole, 2-heptadecylimidazole, 1-benzyl-2-methylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 1-cyanoethyl-2-methylimidazole trimellitate, 1-cyanoethyl-2-phenylimidazole trimellitate, 2,4-diamino-6-]2'-methylimidazolyl-(1')]ethyl-s-triazine, 2,4-diamino-6-[2'-undecylimidazolyl-(1')]ethyl-s-triazine, 2,4-diamino-6-[2'-ethyl-4'-methylimidazolyl-(1')]ethyl-s-triazine, 1-cyanoethyl-2-ethyl-4-methylimidazole trimellitate, 1-cyanoethyl-2-undecylimidazole trimellitate, 1-dodecyl-2-methyl-3-benzimidazolium chloride, 1,3-dibenzyl-2-methylimidazolium chloride; dicyandiamide or its derivatives; organic dihydrazides such as sebacic acid dihydrazide; urea derivatives such as 3-(3,4-dichlorophenyl)-1,1-dimethylurea, 1,1-dimethylurea; polyamidoamines; modified polyamines; boron fluoride-monoethylamine complex; or the like.

The epoxy resin composition of the present invention may optionally be incorporated with other known additives, such as fillers, reactive diluents, resins, solvents, anti-corrosive agents, dyestuffs, pigments, anti-aging agents, or the like.

The present invention is illustrated by the following Examples but is not limited thereto.

EXAMPLE 1

An epoxy resin (Epikote 828, manufactured by Yuka Shell Epoxy Co.) (100 g) is charged into a reactor and is heated to 150° C. With vigorously stirring the liquid at 2,000 to 10,000 r.p.m. with a homomixer, to the liquid is added a liquid butadiene modified with carboxy group at the terminal (Polybd R-45MA, manufactured by Idemitsu Pertroleum Chemical Co.) (10 g) which is previously kneaded with 1,1-bis(t-butylperoxy)-3,3,5-trimethylcyclohexane (Perhexa 3M, manufactured by Nippon Yushi K.K.) (0.2 g). The mixture is reacted with stirring for 30 minutes to give an epoxy resin composition. It was confirmed by an electron microscope that the vulcanized rubber particles dispersed uniformly in the epoxy resin had a particle size of 5 to 10μ.

EXAMPLE 2

A epoxy resin (Epikote 828) (100 g) and a liquid rubber modified with carboxy group at the terminal (Polybd R-45MA) (10 g) are charged into a reactor, and the mixture is heated to 150° C. With vigorously stirring the mixture at 1,000 to 10,000 r.p.m. with a homomixer, Perhexa 3M (0.2 g) is added thereto. The mixture is reacted with stirring for 30 minutes to give an epoxy resin composition wherein the vulcanized rubber particles have a particle size of 5 to 10μ.

EXAMPLE 3

| | |
|---|---|
| Epoxy resin (Epikote 828) | 100 g |
| Liguid rubber (carboxy-modified isoprene rubber, Kuraprene LIR-410, manufactured by Kuraray Isoprene Chemical Co.) | 10 g |
| Vulcanizing agent (Perhexa 3M) | 0.4 g |

By using the above ingredients, and epoxy resin composition (particle size of the vulcanized rubber: 0.5–3μ) is prepared by subjecting them to dynamic vulcanization in the same manner as described in Example 1 or 2.

EXAMPLE 4

| | |
|---|---|
| Epoxy resin (Epikote 834) | 100 g |
| Liquid rubber (Polybd R-45MA) | 10 g |
| Vulcanizing agent (Perhexa 3M) | 0.2 g |

By using the above ingredients, an epoxy resin composition (particle size of the vulcanized rubber: 5–15μ) is prepared by subjecting them to dynamic vulcanization in the same manner as in Example 1 or 2.

EXAMPLE 5

| | |
|---|---|
| Epoxy resin (Epikote 834) | 100 g |
| Liquid rubber (kuraprene LIR-410) | 10 g |
| Vulcanizing agent (Perhexa 3M) | 0.4 g |

By using the above ingredients, an epoxy resin composition (particle size of the vulcanized rubber: 1–5μ) is prepared by subjecting them dynamic vulcanization in the same manner as in Example 1 or 2.

EXAMPLE 6

| | |
|---|---|
| Epoxy resin (Epikote 834) | 100 g |
| Liquid rubber (terminal carboxy-modified acrylonitrile-butadiene rubber having a nitrile content of 10%) (Hycar CTBN 1300 × 15, manufactured by Ube Industries, Ltd.) | 10 g |
| Vulcanizing agent (Perhexa 3M) | 0.2 g |

By using the above ingredients, an epoxy resin composition (particle size of the vulcanized rubber: 0.5–2μ) is prepared by subjecting them to dynamic vulcanization in the same manner as in Example 1 or 2.

EXAMPLE 7

| | |
|---|---|
| Epoxy resin (Epikote 1001) | 100 g |
| Liquid rubber (Polybd R-45MA) | 10 g |
| Vulcanizing agent (Perhexa 3M) | 0.2 g |

By using the above ingredients, an epoxy resin composition (particle size of the vulcanized rubber: 5–25μ) is prepared by subjecting them dynamic vulcanization in the same manner as in Example 1 or 2.

EXAMPLE 8

| | |
|---|---|
| Epoxy resin (Epikote 1001) | 100 g |
| Liquid Rubber (Kuraprene LIR-410) | 10 g |
| Vulcanizing agent (Perhexa 3M) | 0.4 g |

By using the above ingredients, an epoxy resin composition (particle size of the vulcanized rubber: 5–15μ) is prepared by subjecting them to dynamic vulcanization in the same manner as in Example 1 or 2.

EXAMPLE 9

| | |
|---|---|
| Epoxy resin (Epikote 1001) | 100 g |
| Liquid rubber (Hycar CTBN 1300 × 15) | 10 g |
| Vulcanizing agent (Perhexa 3M) | 0.2 g |

By using the above ingredients, an epoxy resin composition (particle size of the vulcanized rubber: 2–5μ) is prepared by subjecting them to dynamic vulcanization in the same manner as in Example 1 or 2.

EXAMPLE 10

| | |
|---|---|
| Epoxy resin (Epikote 1001) | 100 g |
| Liquid rubber (Hycar CTBN 1330 × 13, nitrile content: 17%) | 10 g |
| Vulcanizing agent (Perhexa 3M) | 0.2 g |

By using the above ingredients, an epoxy resin composition (particle size of the vulcanized rubber: 0.5–2μ) is prepared by subjecting to dynamic vulcanization in the same manner as in Example 1 or 2.

EXAMPLE 11

| | |
|---|---|
| Epoxy resin (Epikote 1001) | 100 g |
| Liquid rubber (Hycar CTBN 1300 × 13, nitrile content: 27%) | 10 g |
| Vulcanizing agent (Magnesium oxide) | 0.2 g |

By using the above ingredients, an epoxy resin composition (particle size of the vulcanized rubber: 0.5–2μ) is prepared by subjecting them to dynamic vulcanization in the same manner as in Example 1 or 2.

EXAMPLE 12

| | |
|---|---|
| Epoxy resin (Epikote 1001) | 100 g |
| Liquid rubber (Hycar CTBN 1300 × 8) | 10 g |
| Vulcanizing agent: sulfur powder | 1 g |
| zinc oxide | 0.4 g |
| Stearic acid | 0.2 g |
| Vulcanization accelerator: | |
| Noxeller DM (manufactured by Ouchi Shinko Kagaku K.K.) | 0.4 g |
| Noxeller TT (manufactured by the same company as above) | 0.6 g |

By using the above ingredients, an epoxy resin composition (particle size of the vulcanized rubber: 0.5-2μ) is prepared by subjecting them to dynamic vulcanization in the same manner as in Example 1.

EXAMPLE 13

In the same manner as described in Example 12 except that zinc oxide and stearic acid are simultaneously added to the epoxy resin together with liquid rubber and thereafter sulfur powder and vulcanization accelerator are added thereto with stirring, the dynamic vulcanization is carried out to give an epoxy resin composition (particle size of the vulcanized rubber: 0.5-2μ).

EXAMPLE 14

| | |
|---|---|
| Epoxy resin (Epikote 1001) | 100 g |
| Liquid rubber (Hycar CTBN 1300 × 8) | 10 g |
| Vulcanizing agent (magnesium oxide) | 1 g |

By using the above ingredients, an epoxy resin composition (particle size of the vulcanized rubber: 0.5-2μ) is prepared by subjecting them to dynamic vulcanization in the same manner as in Example 1.

EXAMPLE 15

| | |
|---|---|
| Epoxy resin (Epikote 1001) | 100 g |
| Liquid rubber (Hycar CTBN 1300 × 8) | 10 g |
| Vulcanizing agent (magnesium oxide) | 1 g |

By using the above ingredients, an epoxy resin composition (particle size of the vulcanized rubber: 0.5-2μ) is prepared by subjecting them to dynamic vulcanization in the same manner as in Example 2.

EXAMPLE 16

| | |
|---|---|
| Epoxy resin (Epikote 1001) | 100 g |
| Liquid rubber (Hycar ATBN 1300 × 16, modified with amino at the terminal, nitrile content: 16.5%, manufactured by Ube Industries, Ltd.) | 10 g |
| Vulcanizing agent (Perhexa 3M) | 0.2 g |

By using the above ingredients, an epoxy resin composition (particle size of the vulcanized rubber: 0.5-2μ) is prepared by subjecting them dynamic vulcanization in the same manner as in Example 1 or 2.

EXAMPLE 17

| | |
|---|---|
| Epoxy resin (Epikote 1001) | 100 g |
| Liquid rubber (Hycar HTBN 1300 × 17, modified with carboxy at the terminal, nitrile content: 16.5%, manufactured by Ube Industries, Ltd.) | 10 g |
| Vulcanizing agent (Perhexa 3M) | 0.2 g |

By using the above ingredients, an epoxy resin composition (particle size of the vulcanized rubber: 0.5-2μ) is prepared by subjecting them to dynamic vulcanization in the same manner as in Example 1 or 2.

EXAMPLE 18

| | |
|---|---|
| Epoxy resin (Epikote 1001) | 100 g |
| Liquid rubber (Nippol 1312, not terminal modified, nitrile content: 30%, manufactured by Nippon Zeon K.K.) | 10 g |
| Vulcanizing agent (Perhexa 3M) | 0.2 g |

By using the above ingredients, an epoxy resin composition (particle size of the vulcanized rubber: 0.5-2μ) is prepared by subjecting them dynamic vulcanization in the same manner as in Example 1 or 2.

EXPERIMENTS

Heat-curable, one-pack type adhesives were prepared by mixing the epoxy resin compositions (each 50 parts by weight) obtained in the above Examples 9, 10, 12, and 16-18 with the following ingredients:

| | |
|---|---|
| Epoxy resin (Epikote 828) | 50 (parts by weight) |
| Dicyandiamide | 5 (parts by weight) |
| Curezole 2P4MHZ (2-phenyl-4-methyl-5-hydroxymethylimidazole, manufactured by Shikoku Kasei K.K.) | 4 (parts by weight) |
| Aerosile (anhydrous silicic acid, manufactured by Nippon Aerosile Co.) | 3 (parts by weight) |
| Al powder | 80 (parts by weight) |

The adhesives thus obtained were each coated onto two SPCC steel panels (size, 25×100×0.8 mm, as defined in JIS G3141) in a thickness of 0.1 mm. The SPCC steel panels were piled on each other so that the coated faces faced each other, and the coated layer was cured by heating at 150° C. for 30 minutes. The resulting steel panels were subjected to peel strength test (T-peel strength test using an autograph manufactured by Shimadzu Seisakusho, cross head speed: 50 mm/minute). The test results are shown in Table 1. As a reference the same test was done by using an epoxy resin (Epikote 1001) instead of the epoxy resin composition of the present invention. The result is also shown Table 1.

TABLE 1

| Epoxy resin composition | T-peel strength ($\times 10^3$ N/m) |
|---|---|
| Example 9 | 8.6 |
| Example 10 | 9.8 |
| Example 12 | 8.0 |
| Example 14 | 11 |
| Example 16 | 9.8 |
| Example 17 | 5.9 |
| Example 18 | 3.9 |
| Reference example | 0* |

*The coated layer was broken, and the peel strength could not be measured.

What is claimed is:

1. A curable epoxy resin composition which comprises 100 parts by weight of an epoxy resin which is liquid at room temperature or at an elevated temperature and 0.05 to 60 parts by weight of vulcanized rubber particles having a particle size of 0.5 to 30μ, said composition made by vulcanizing with a vulcanizing agent at an elevated temperature a dispersion in the epoxy resin of fine particles of a liquid rubber immiscible at that elevated temperature with the epoxy resin, wherein said epoxy resin remains uncured at the time of the vulcanization of said rubber particles.

2. A composition according to claim 1, wherein the epoxy resin is a member selected from the group consisting of a condensation product of epichlorohydrin and a polyhydric alcohol or polyhydric phenol, a cyclohexane oxide type epoxy resin, cyclopentane oxide type epoxy resin, an epoxy resin derived from a di- or polyolefin polymer or copolymer, an epoxy resin obtained from a copolymer of glycidyl methacrylate and vinyl compound, and an epoxy resin obtained from a glyceride of a highly unsaturated aliphatic acid.

3. A composition according to claim 1, wherein the liquid rubber is a member selected from the group consisting of urethane rubber, polysulfide rubber, isoprene rubber, acrylonitrile-butadiene rubber, and a modified product thereof with carboxyl, hydroxy or amino group at the terminal or intermediate of the chain thereof.

4. A composition according to claim 1, wherein the vulcanizing agent is a member selected from the group consisting of sulfur, a sulfur compound, an organic peroxide, an oxime, and a metal oxide.

5. A composition according to claim 1, wherein the epoxy resin is a bisphenol A diglycidyl ether type epoxy resin, the liquid rubber is an acrylonitrile-butadiene rubber modified with carboxyl group at the terminal, and the vulcanizing agent is an organic peroxide or magnesium oxide.

6. A method for the preparation of a curable epoxy resin composition, which comprises the steps of heating an epoxy resin, to form a liquid epoxy resin adding thereto a liquid rubber incompatible with the epoxy resin in an amount of 0.05 to 60 parts by weight per 100 parts by weight of the epoxy resin, stirring the mixture and thereby dispersing the liquid rubber in the liquid epoxy resin, and vulcanizing the rubber with a vulcanizing agent to form a dispersion of solid fine particles of vulcanized rubber having a particle size of 0.5 to 30$\mu$ in said liquid epoxy resin.

7. A method according to claim 6, wherein the heating of epoxy resin is carried out at a temperature of 100° to 200° C.

8. A method according to claim 6, wherein the stirring of the mixture of an epoxy resin and a liquid rubber is carried out at 1,000 to 10,000 r.p.m.

* * * * *